March 4, 1969  A. BINDERNAGEL  3,430,836

SPIRAL WELD TUBE AND PIPE MILLS

Filed March 24, 1967

Inventor
Ali Bindernagel his Attorneys

3,430,836
SPIRAL WELD TUBE AND PIPE MILLS
Ali Bindernagel, Dusseldorf-Gerresheim, Germany, assignor to Kommanditgesellschaft Friedrich Kocks, Dusseldorf, Germany, a corporation of Germany
Filed Mar. 24, 1967, Ser. No. 625,639
U.S. Cl. 228—15      4 Claims
Int. Cl. B23k 1/20

ABSTRACT OF THE DISCLOSURE

Apparatus is provided for spiral weld tube and pipe mills in which a horizontal loop forming device is provided in place of vertical looping pits and in which a strip feeder to a welding head and direction-changing means are provided for changing the direction of strip going to the welding head which direction-changing means receives strip from the loop forming device and is free to move with the changing movements of the strip feeder to the welding head.

---

Figure 1:
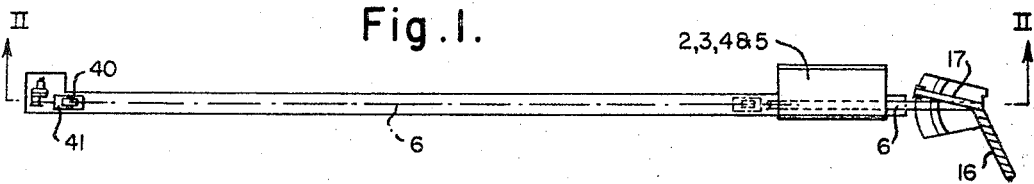

This invention relates to spiral weld tube and pipe mills and particularly to a mill designed to reduce the large loops which are necessary in prior art spiral weld tube and pipe mills and to eliminate the edge damage and twist which characterized such mills in the past.

In the past there has been proposed spiral weld tube and pipe mills in which the strip being formed and welded is formed into a loop between the strip preparation section (stationary section) and the swivel table (swivelling section). This loop makes it possible for the strip delivered by the strip preparation section to follow the swivelling strip guide and entry table without being forced or deformed. If the loop shall be used also as loop storage in case of continuously and automatically working tube and pipe mills for compensating the time necessary for introducing and welding a new strip, it should have a length according to gauge, strip width and welding speed of 30, 100 and more meters for welding the spiral strip edges, particularly when high frequency welding is applied as compared to the submerged-arc, resistance or induction welding with normal frequency with high welding speed. It is evident that in case of loops where the strip is turned off downwards and upwards perpendicularly to the strip surface, the pits and/or stands for such loops would be extremely costly and therefore would virtually not be feasible. For this reason, a known inclined to horizontal arrangement of the loop is applied which is operated by means of a stretch car. When using such a known loop arrangement between the stationary strip preparation section and the swivelling strip guide and entry table of a spiral weld tube and pipe mill, the difficulty occurs that in case of each swivelling the strip guide and entry table, the strip side of a length of 30, 100 meters or more being delivered to it must be swivelled too. Owing to the great length and the heavy weight of the strip, considerable acceleration forces would occur because the control and swivelling movements of the strip guide and entry table have to be made rapidly. For this reason, rollers should be arranged at the side of the strip guide and entry table at least perpendicularly to the strip surface for ensuring a lateral guidance of the strip and transferring the movements of the strip guide and entry table to the strip. These rollers could damage the strip edges according to the control movement one time on the one side, another time on the other side of the strip. Above all, in case of swivelling the strip guide and entry table, the longitudinal centerline of the strip side running out of the loop would not be any longer in line with same of the strip guide and entry table, but these would form a more or less great angle and thus buckle or arch. Consequently, the strip would not be supported any longer on the whole width of the feeding roller arranged at the end of the strip guide and entry table so that the delivery of the strip in a centered position to the strip guide and entry table cannot be ensured and in many cases is not possible.

To avoid these problems of the prior art and for enabling the delivery of the strip excluding any forced action and damage of the strip edges in case of an above described plant and also when great production speeds are concerned and consequently a required great length of the loop, this invention suggests that, apart from a means for turning the strip off its plane by approximately 180°, a second means be provided at the rear end of the strip guide and entry table under or on same directly in, ahead of or behind the center of rotation of the strip guide and entry table for turning the strip off its feeding plane by approximately 180° and that the strip be delivered to this second means from an inclined or horizontal loop arrangement. Consequently, the strip is not delivered directly to the swivelling strip guide and entry table, but is formed to a second recurrent loop by being delivered e.g. below the strip guide and entry table to the rotation axis of same and being there turned round by approximately 180°. The strip can be turned round in this case either around a roller which can be swivelled around the rotation axis of the strip guide and entry table horizontally as well as also around an axis perpendicularly to the roller axle or a cup-shaped device open towards the delivery direction of the strip is used for turning round the strip. The vertex of the cup arch should be preferably in or at least near the rotation axis of the strip guide and entry table. The cup serves only for turning round the leading end when a new strip is entered. On operation, the vertex of the loop shall not be in contact with the cup, but shall be supported freely. For enabling that the vertex of the strip loop maintains its position to the rotation axis of the strip guide and entry table, the strip is advanced by a pinch roll arranged ahead of the loop in a slower or faster speed according to the deviation of the vertex from its nominal position. The control of the pinch roll is effected by means of mechanical or electrical impulse senders scanning the position, e.g. photocells. Owing to the above described arrangement the strip can, above all in case of the embodiment with a cup-shaped device, twist freely so that it is delivered without or between unloaded or only slightly loaded guide rollers in centered position to the strip guide and entry table of the entry roller and so that it is supported on it evenly and is delivered parallelly and in centered position to the axis of the strip guide and entry table of the forming section. In case of pressure welding, especially high frequency welding, the strip edge must be made to coincide exactly with the tube or pipe edge. The prior condition, however, is that the strip is pushed absolutely planely into the tube or pipe forming section. When turning round, however, especially in case of thick strip, the yield point of the material is exceeded and the strip tends when running off the roller to retain the form obtained when turning round so that the strip becomes no longer plane, but wavy. For this reason, the strip can be levelled again prior to entering the forming section, this necessitating, however, a leveller.

For the above reasons, a leveller also is provided on the strip guide and entry table in addition to the pinch roll. It has also proved expedient to arrange the strip edge planning device on the strip guide and entry table only following the leveller thus ensuring, especially in case of bevelled edges, that the strip edges remain undamaged.

In the drawing, an embodiment of the invention is shown, represented by:

FIGURE 1, a schematic top plan view of a spiral weld tube and pipe mill with horizontal loop arrangement including a second loop which is arranged under the strip guide and entry table and runs in opposite direction.

Figure 2:
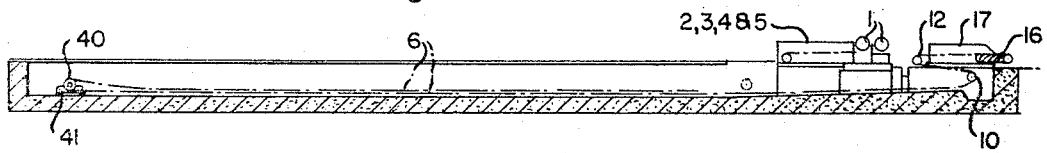

FIGURE 2 is a section on the line II—II of FIGURE 1.

Figure 3:
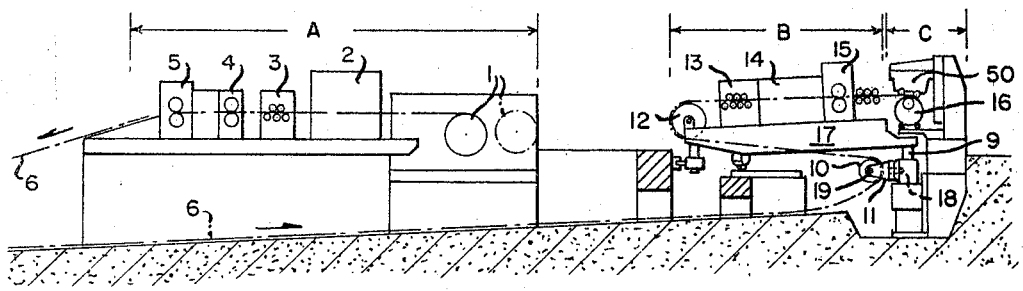

FIGURE 3, a side view in enlarged scale of the strip preparation section and the strip guide and entry table of a spiral weld tube and pipe mill comprising a strip return roller for the second loop arranged under the strip guide and entry table.

Figure 4:
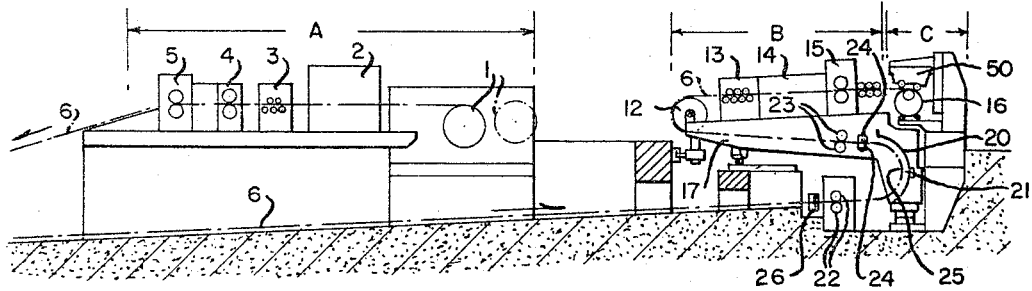

FIGURE 4, a side view in enlarged scale of the strip preparation section and the strip guide and entry table of a spiral weld tube and pipe mill comprising a strip return cup for the second loop arranged under the strip guide and entry table.

The spiral weld tube and pipe mill comprises:

(1) The stationary strip preparation section A including an uncoiler 1, an end shear and weld unit 2, a strip leveller 3, a trimming shear with scrap chopper 4 and a pinch roll 5, (2) The strip feeding section B comprising the strip guide and entry table 17 which can be swivelled around the axis 9, the entry roller 12, a strip leveller 13, a strip edge planning device 14, and a pinch roll drive 15, (3) The forming section C in which the strip 6 is formed to a tube or pipe 16.

In FIGURE 3, a return roller 10 is mounted under the strip guide and entry table in a pillow block 11 so that it can swivel around the axis 19, whereas the pillow block 11 along with the roller 10 is so mounted that it can swivel freely around the axis 18 and eventually also around the axis 9.

According to FIGURE 4, under the strip guide and entry table 17 are arranged a return cup 20 including a measuring device 21 with the aid of which the position of the strip loop 25 to the cup is measured as well as non-driven horizontal and vertical guide rollers 23 and 24. In addition, non-driven guide rollers 26 and the pinch roll 22 are provided which are connected with the foundation.

In the apparatus of FIGURE 3, the strip 6 leaves reel 1 and passes through the shear and weld unit 2, strip leveller 3, trim shear 4 and pinch roll 5, thence around roll 40 on looper 41 and back to return roller 10 and from there to entry roller 12, leveller 13, edge plane 14, pinch roll 15 and into the forming section 50. The pivot of roll 10 on horizontal shaft 19 and pillow block 11 on shafts 18 and 9 permit universal articulation of roll 10 as the feed and forming sections are rotated to provide the necessary angle for pipe or tube forming.

In the apparatus of FIGURE 4, those elements which are identical to like elements of FIGURE 3 bear like numbers. In operation, the apparatus of FIGURE 4 substitutes the cup 20 and pinch rolls 22–23 for roll 10 of FIGURE 3. In this embodiment the position of the strip loop 25 vis-a-vis the cup 20 is measured by device 21 which controls the drive on pinch roll 22 so as to control the position of loop 25 with respect to cup 20.

While I have illustrated and described certain preferred practices and embodiments of our invention in the foregoing specification, it will be understood that this invention may be otherwise embodied within the scope of the following claims.

I claim:

1. In a spiral weld tube and pipe mill in which the strip is delivered from an uncoiler by means of a pinch roll through end shear and weld unit, a strip leveller and a side trimmer to a strip guide and entry table and from there to the forming section and in which the angle between the stationary tube and pipe axis and the feeding direction can be turned especially for eliminating deviations of the welding gap by swivelling the strip feed around a pivot intersecting the tube and pipe axis, the area ahead of the strip guide and entry table being arranged in straight line representing the middle of the strip feeding direction, the strip guide and entry table only being swivelled and in which a strip being fed forms a loop between the uncoiler and the swivelling part, the improvement comprising direction changing means for turning the strip by approximately 180° from its feeding plane provided at the rear end of the strip guide and entry table in a plane spaced from the plane of such table and adjacent the point of rotation of the strip guide and entry table and means delivering the strip to this direction-changing means from one of an inclined and horizontal loop arrangement.

2. Spiral weld tube and pipe mill as per claim 1 characterized in that the second return equipment is a roller rotating around an axle, the pillow block of same is mounted so that it can be rotated freely around the axle.

3. Spiral weld tube and pipe mill as claimed in claim 2 characterized in that the pillow block can be rotated also around the axle of the swivelling table.

4. Spiral weld tube and pipe mill as claimed in claim 1 characterized in that a return cup is arranged under the strip guide and entry table as second return equipment.

References Cited

UNITED STATES PATENTS

| | | | |
|---|---|---|---|
| 3,114,341 | 12/1963 | Diener | 228—5 |
| 3,210,980 | 10/1965 | Sengel | 228—15 |
| 3,239,122 | 3/1966 | Berkeley | 228—15 |
| 3,287,536 | 11/1966 | Fay | 228—18 |

RICHARD H. EANES, JR., *Primary Examiner.*